United States Patent [19]

Stevenson et al.

[11] Patent Number: 5,731,520
[45] Date of Patent: Mar. 24, 1998

[54] ACCELERATION SENSING MODULE WITH A COMBINED SELF-TEST AND GROUND ELECTRODE

[75] Inventors: Paul Elwin Stevenson, Colorado Springs, Colo.; Craig Hamman Stephan, Ann Arbor; Amer Mohammad Samman, Dearborn, both of Mich.; Leland Joseph Spangler, Manitou Springs, Colo.

[73] Assignee: Ford Global Technologies, Inc., Dearborn, Mich.

[21] Appl. No.: 696,545

[22] Filed: Aug. 14, 1996

Related U.S. Application Data

[62] Division of Ser. No. 363,767, Dec. 23, 1994, Pat. No. 5,587,518.

[51] Int. Cl.⁶ .................... G01P 21/00; G01P 15/125
[52] U.S. Cl. .................. 73/514.32; 73/1.38; 73/514.36
[58] Field of Search ........................ 73/1 D, 514.52, 73/1 B, 1 C, 862.626, 862.337, 780, 862.52, 862.541, 862.192, 514.02, 650, 514.36, 1.38

[56] References Cited

U.S. PATENT DOCUMENTS

| 4,736,629 | 4/1988 | Cole . | |
|---|---|---|---|
| 5,220,835 | 6/1993 | Stephan | 73/514.32 |
| 5,404,749 | 4/1995 | Spangler | 73/514.32 X |
| 5,410,915 | 5/1995 | Yamamuto | 73/514.32 |
| 5,429,736 | 7/1995 | Shimada et al. | 73/514.32 X |
| 5,433,101 | 7/1995 | Spangler et al. | 73/1 D |
| 5,445,006 | 8/1995 | Allen et al. | 73/1 D |
| 5,465,604 | 11/1995 | Sherman | 73/1 DV |
| 5,492,020 | 2/1996 | Okada | 73/1 D X |
| 5,561,248 | 10/1996 | Negoro | 73/514.36 X |
| 5,610,335 | 3/1997 | Shaw et al. | 73/514.36 |

OTHER PUBLICATIONS

*Patent Abstracts of Europe* "Electrostatic pendulum accelerometer e.g. for vehicle airbag actuation –has test electrode on side of silicon opposite to main electrode and applies test voltage between both electrodes" abstract of French patent 2694403 dated Feb. 4, 1994 by Levy Michel et al.

*Primary Examiner*—Thomas P. Noland
*Attorney, Agent, or Firm*—Peter Abolins

[57] ABSTRACT

A micro-machined accelerometer includes a moveable metal plate, mounted upon a semiconductor substrate. The moveable metal plate includes an aperture which contains a pedestal and at least one torsion bar for connecting the pedestal to the moveable metal plate. Measurement electrodes formed on the semiconductor substrate combine with the metal plate to form measurement capacitors A combined self-test/common electrode provides a dual function of a common electrode during operation of the accelerometer and a testing electrode during a self-test procedure.

11 Claims, 3 Drawing Sheets

ACCELERATION SENSING MODULE WITH A COMBINED SELF-TEST AND GROUND ELECTRODE

This is a division of application Ser. No. 08/363,767, filed Dec. 23, 1994 now issued as U.S. Pat. No. 5,587,518.

FIELD OF THE INVENTION

This invention relates to the field of accelerometers, and, in particular, to silicon micro-machined accelerometers.

BACKGROUND OF THE INVENTION

Accelerometers are used in a variety of applications to provide an accurate indication of an acceleration force. For instance, some vehicle airbag systems which deploy an airbag under certain conditions to protect vehicle passengers, utilize accelerometers to provide an indication of acceleration placed on the vehicle. Because accurate detection of acceleration is often critical, accelerometers typically utilize self-testing mechanisms to facilitate testing of the accelerometer. Particularly important is a self-test feature which checks the mechanical integrity and stability of the accelerometer. In the micro-machined type of accelerometers which are sometimes utilized in vehicle airbag systems, conventional self-testing mechanisms introduce additional circuit elements, thereby adding additional cost and complexity to the manufacture of the accelerometer and to the subsequent diagnostic testing of the accelerometer. Moreover, conventional self-testing mechanisms can cause temperature coefficient problems, and also only test electrical continuity, rather than testing the mechanical integrity of the accelerometer.

Accordingly, there is a need for a micro-machined accelerometer which provides an improved self-testing mechanism.

SUMMARY OF THE INVENTION

It is an object of the present invention to provide a micro-machined accelerometer which facilitates the accurate testing of the accelerometer.

In accordance with the primary object of the invention, in a preferred embodiment, an accelerometer is operable in a first mode to detect an acceleration force, and in a second mode to test the operability of the accelerometer. The accelerometer includes a substrate and a moveable plate held at a fixed electrical potential and substantially parallel to and above the substrate, which includes, an aperture, a pedestal positioned within the aperture, and connected to the substrate, and a means for connecting the pedestal to at least one edge of the aperture, to allow the moveable plate to rotate, relative to the substrate, about a flexure axis, in the presence of a force normal to the substrate. The accelerometer also includes a first electrode formed upon the substrate, which receives an AC voltage during the first mode and the second mode, and a second electrode formed upon the substrate at a position opposite of the flexure axis from the first electrode, the second electrode receiving a voltage substantially similar to said AC voltage as the first electrode during the first and the second modes, and a third electrode formed upon the substrate, the third electrode charged to an electrical potential substantially equal to the fixed electrical potential during the first mode, and at a different electrical potential during the second mode.

An advantage of certain preferred embodiments is that complexity of the accelerometer is reduced by utilizing a single electrode, which performs both a self-test and a grounding function. A further advantage is that, under certain circumstances, the combined self-test and common electrode reduces charge build-up, or leakage onto the insulating substrate.

These and other features and advantages of the present invention may be better understood by considering the following detailed description of a preferred embodiment of the invention. In the course of this description, reference will frequently be made to the attached drawings.

DETAILED DESCRIPTION

Figure 1:
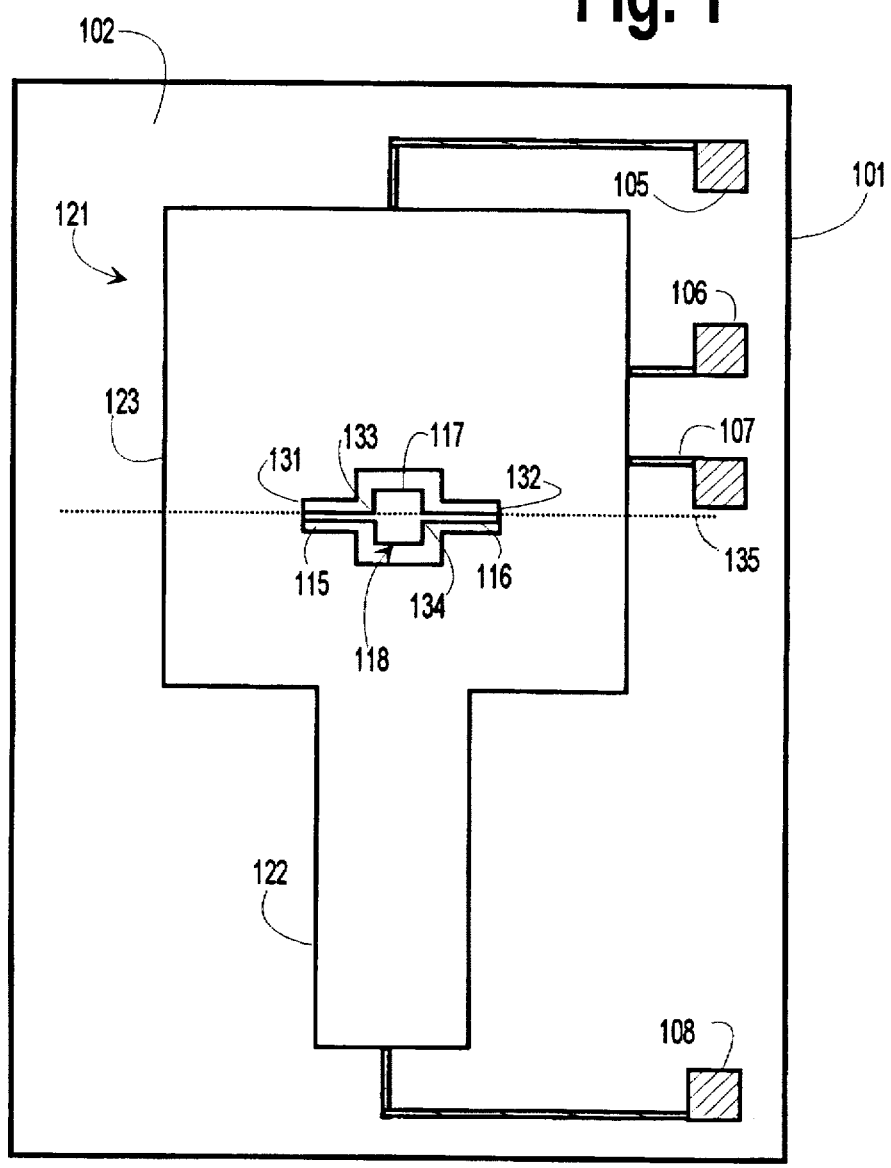
FIG. 1 of the drawings shows a block diagram of portions of a preferred embodiment.

FIG. 1 of the drawings shows a top-view of a preferred sense element chip 101 which may be used to advantage in an accelerometer useable in a "single-point" automotive passive restraint system in which the accelerometer is located in the passenger compartment of the vehicle. The sense element chip 101 is a torsional device with differential mass and a central "pedestal" support with capacitive plates and an electrostatic self-test mechanism. In FIG. 1, the sense element chip 101 includes a moveable plate 121 mounted above the upper surface 102 of a substrate. The substrate preferably takes the form of a pyrex glass wafer, the upper surface 102 of which is shown in FIG. 1.

Moveable plate 121 is preferably formed using single crystal silicon. An aperture 118 is formed within moveable plate 121 and includes a pair of torsion bars 115 and 116 and a pedestal 117 disposed within the aperture. Torsion bar 115 is integral with an edge of the aperture 118 of moveable plate 121 at first end 131 and is integral with pedestal 117 at second end 133. Torsion bar 116 is integral with an edge of the aperture 118 of moveable plate 121 at first end 132 and is integral with pedestal 117 at second end 134. In the embodiment of FIG. 1, torsion bars 115 and 116 are each positioned on opposite sides of pedestal 117, and along with pedestal 117 are each formed of the same material as moveable plate 121. Pedestal 117 is mounted to the upper surface 102 by an anodic bonding process The upper surface 102 has formed thereon a plurality of electrodes which preferably take a form as shown in further detail in FIG. 2(b). Conductors 105, 106, 107 and 108 provide an electrical connection between a detection circuit and electrodes (not shown) which are positioned below the moveable plate 121. As can be seen in FIG. 1, moveable plate 121 is shaped in the form of a paddle with a first end 122 and a second end 123. The difference in mass of the first end and the second end with respect to axis 135 results in the first end being lighter than the second end. Hereinafter, first end 122 will be referred to as the lighter end, and second end 123 will be referred to as the heavier end. In an alternative embodiment, the moveable plate 121 may be trident shaped, with a stem similar to lighter end 122 and the heavier end having first, second and third prongs. The discrepancy in mass of the moveable plate 121 causes the plate to rotate about the flexure axis in the presence of acceleration normal to the substrate, the degree of rotation being approximately proportional to the magnitude of the acceleration. The sense element chip 101 is preferably fabricated with a glass substrate, dissolved wafer, single-crystal silicon process.

Figure 2A:
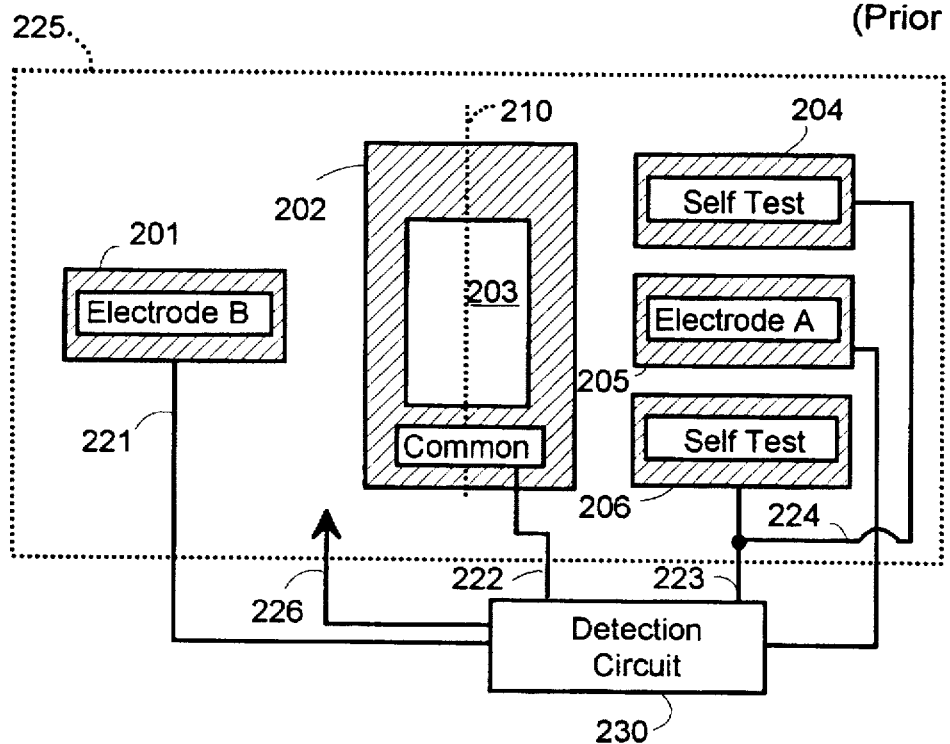
FIG. 2(a) shows a block diagram of a portion of a known accelerometer.

FIG. 2(a) of the drawings shows a block diagram of a conventional sense element chip with electrodes positioned below a moveable plate as shown in FIG. 1. The sense element chip of FIG. 2(a) utilizes separate electrodes for self-test and ground functions, and a detection circuit which detects capacitance changes of the capacitors on the accelerometer. In FIG. 2(a), measurement electrodes 201 and 205 are of equal dimensions and are symmetrically positioned at opposite sides of flexure axis 210. Self-test electrodes 204 and 206 are positioned on opposing sides of measurement electrode 205, and common electrode 202 surrounds an opening 203 for a pedestal. Common electrode 202 suppresses transient surface charges by holding the surface beneath the moveable plate to a constant potential, thereby maintaining a zero-force condition between the upper surface of the substrate and the moveable plate. In the arrangement shown in FIG. 2(a), a common node conductor 222 couples common electrode 202 to detection circuit 230, and a separate self-test conductor 223 couples self-test electrodes 204 and 206 to the detection circuit 230. A conductor 226 couples opening 203 to detection circuit 230. Conductors 221 and 224 connect electrodes 201 and 205, respectively, to detection circuit 230. As can be seen in FIG. 2(a), conductor 224 must be formed in a manner to circumvent conductor 227, thus causing complexit in chip layout and increased chip size. During the operational mode of the accelerometer, the common and self-test electrodes are held at a reference potential, which is the same potential as that of the moveable plate. During self-test mode, the common and self-test electrodes are held at a self-test potential.

Figure 2B:
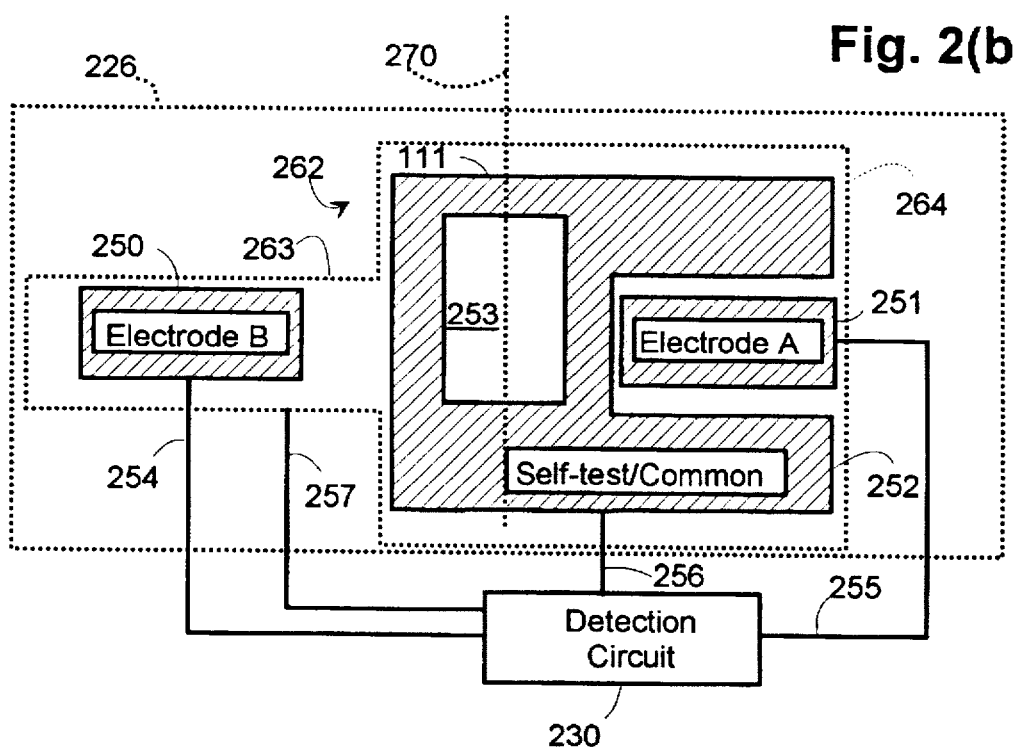
FIG. 2(b) shows a block diagram of a portion of an accelerometer which incorporates the principles of the invention.

A preferred embodiment advantageously utilizes a single electrode to perform both self-test and surface charge suppression functions. FIG. 2(b) shows a top view of a preferred arrangement of electrodes 110, 111, and 112 on the upper surface 102 of the sense element chip shown in FIG. 1. Moveable plate 121 can be seen represented in FIG. 2(b) in the form of a dotted line. In FIG. 2(b), measurement electrodes 250 and 251 formed to be of equal shape and size and are positioned symmetrically about flexure axis 270. The common and self-test electrodes 202, 204 and 206 of FIG. 2(a) however are combined in FIG. 2(b) to form a single self-test/common electrode 252, which surrounds an opening 253 for a pedestal and extends around opposing sides of measurement electrode 251. As with common electrode 202 in FIG. 2(a), common/self-test electrode 252 suppresses transient surface charges, by holding the surface beneath the moveable plate to a constant potential, thereby maintaining a zero-force condition between the surface of the substrate and the moveable plate. Conductors 254 and 255 couple electrodes 250 and 251 respectively to detection circuit 230, and conductor 256 couples self-test/common electrode 252 to the detection circuit 230. Conductor 257 couples opening 253 to detection circuit 230. In the embodiment of FIG. 2(b), the combined self-test/common electrode advantageously requires only a single conductor (256) to be formed upon the upper surface of the sense element chip, instead of the three separate conductors (222, 223 and 224) required for the separate self-test and common electrodes of FIG. 2(a). Cost savings in manufacturing of the module are thus achieved and reliability is enhanced by reducing the number of conductors required to be formed on the upper surface, by reducing the number of conductors to be formed on the substrate and by eliminating a bond pad and the two associated wire bonds necessary to connect the electrodes to the detection circuitry.

Combining the self-test and common electrodes also reduces the chance of an open circuit to the common electrode. During self-test mode, a self-test potential is applied to the self-test electrode of FIG. 2(a), and the resulting rotation of the plate is measured. In the configuration of FIG. 2(a), an open circuit to the common electrode will go undetected. An open ground circuit could result in failed operation due to the common electrode rising to an unknown potential, thus applying a force on the moveable plate. Such a force would cause movement of the moveable plate relative to the measurement electrodes, thus causing inaccurate measurement during operation. In addition, under such circumstances, charge bleeding off of electrodes 201 or 205 could also cause the common electrode to rise to an unknown potential. In the embodiment shown in FIG. 2(b), an open circuit to the self-test/common electrode during self-test would be revealed. Moreover, the chance of charge build-up upon the substrate is reduced by providing a path by which charge may be removed.

In FIG. 2(b) the moveable plate 121 of FIG. 1 is shown as dotted line 262, with a lighter end 263 and a heavier end 264. The difference between the mass of the lighter end 263 and heavier end 264 causes flexing of the moveable plate 262 about flexure axis 270 when subjected to a force normal to the plane of upper surface of the sense element chip. Electrode 250 combines with a portion of light end 262 to form a first measurement capacitor, electrode 251 combines with a portion of heavier end 264 to form a second measurement capacitor, and electrode 252 combines with other portions of moveable plate 262 to form a self-test capacitor.

Movement of the moveable plate 262 about flexure axis 270 in response to an acceleration force, causes the capacitances of the first measurement capacitor and the second measurement capacitors to change in proportion to the amount by which the moveable plate rotates. The capacitance changes are detected by detection circuit 230 which determines the direction and magnitude of the acceleration, as a function of the change in capacitance. When the accelerometer is in an operational mode to detect an acceleration force, the self-test/common electrode and the moveable plate are held at substantially the same potential. Flexing of the moveable plate is reflected by a change in capacitance at the capacitors formed by the measurement electrodes, which receive an AC voltage during self-test and operational modes. When the accelerometer is in a self-test mode, the self-test/common electrode is charged to a self-test potential, which is different from the potential of the moveable plate, thus causing flexure of the moveable plate. As can be seen in FIG. 2(b) the self-test/common electrode is asymmetrical about the flexure axis 270. Thus during self-testing, the self-test/common electrode will apply an electrostatic force to the moveable plate which is asymmetrical about the flexure axis. This will cause the moveable plate to rotate about the flexure axis in a manner similar to the rotation caused by acceleration. Thus as can be seen the self-test/common electrode 252 improves testing of the sense element chip by more closely simulating actual acceleration conditions.

Figure 3:
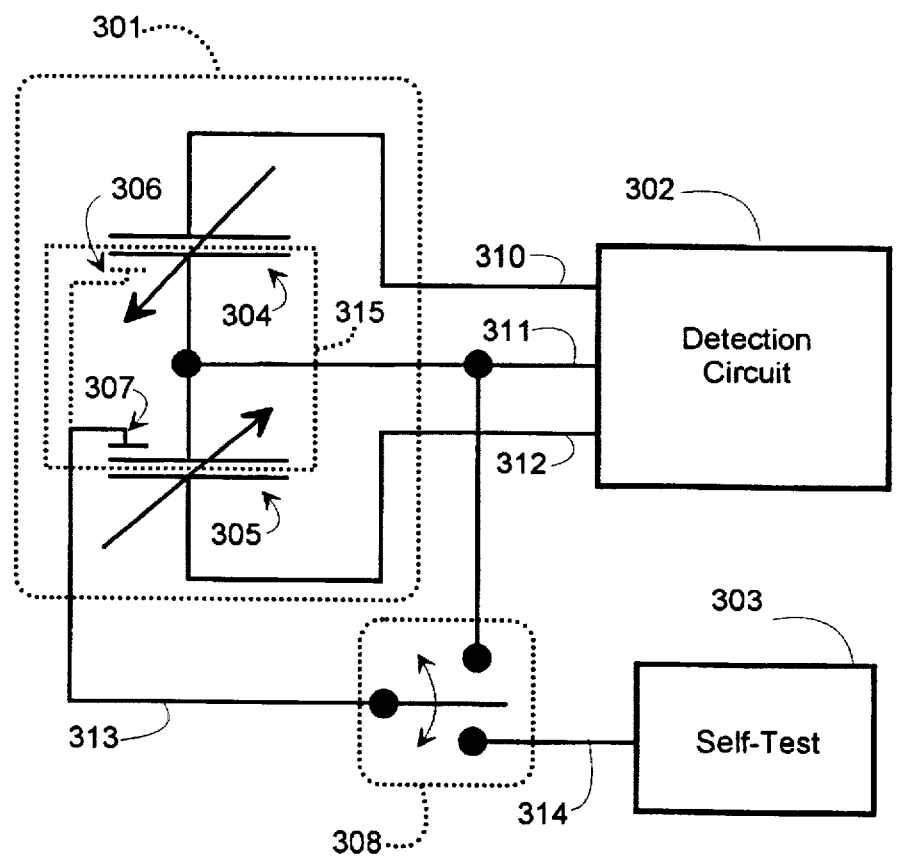
FIG. 3 shows an embodiment utilizing the principles of the embodiment of FIG. 2(b).

FIG. 3 of the drawings shows a schematic diagram of an accelerometer which utilizes a sense element chip of the type shown in FIG. 2(b). The sense element chip shown in FIG. 2(b) is shown schematically in FIG. 3 at 301. The measurement capacitors of chip 301 are shown in schematic form at 304 and 305 as variable capacitance capacitors. The mechanical coupling at the pedestal between the measurement capacitors 304 and 305 is shown in schematic form as capacitors at 306 and 307. Capacitor 306 is represented as a dotted line to indicate the asymmetry in charge imposed upon the moveable plate.

The sense element chip 301 is coupled to a detection circuit 302 via three signal lines. The voltage at measurement capacitors 304 and 305 is transmitted to detection circuit 302 via signal lines 310 and 312. A common mode signal line 311 couples the common node of capacitors 304 and 305 to the detection circuit. The detection circuit uses a "charge-mode" delta-sigma modulator with integrated calibration circuitry.

In FIG. 3, the moveable plate 252 of FIG. 2(b) is seen represented by the dotted line 315 which includes the lower plate of capacitor 304 and the upper plate of capacitor 305. The upper plate of capacitor 304 represents electrode 250 and the lower plate of capacitor represents electrode 251.

Self-test of the accelerometer of FIG. 3 is accomplished by coupling signal line 313 of sense element chip 301 to self-test module 303 via switch 308. Self-test module 303 provides a self-test voltage via self-test line 313 to self-test/ common electrode 306 and 307. The resulting change of capacitance of capacitors 304 and 305 is detected by detection circuit 302 by measuring the voltage transmitted over signal lines 311 and 312. During operation of the accelerometer self-test line 313 is coupled to common mode path 311.

It is to be understood that the specific mechanisms and techniques which have been described are merely illustrative of one application of the principles of the invention. Numerous modifications may be made to the methods and apparatus described without departing from the true spirit and scope of the invention. For instance, the moveable plate may take a variety of forms. In addition, the pedestal and torsion bars may take one of a number of forms which utilize one or more torsion bars to allow the moveable plate to flex about a flexure axis in response to an acceleration force normal to the moveable plate.

What is claimed is:

1. An acceleration sensing module comprising, in combination:
    a detection circuit having a first, second and third signal terminals;
    a self-test circuit for providing a self-test signal for placing said accelerometer in a self-test mode; and
    a sense element chip comprising,
        a substrate;
        a moveable plate substantially parallel to and above said substrate, said moveable plate mounted to said substrate via a pedestal; and
        exactly three electrodes formed upon said substrate and coupled to said detection circuit, said three electrodes consisting of a first electrode and a second electrode, coupled respectively to said first and said second terminals, which each combine with portions of said moveable plate to form measurement capacitors, useable by said detection circuit for determining the presence of an acceleration normal to said substrate, said three electrodes also consisting of a third electrode, coupled to said third terminal, which combines with portions of said moveable plate to form, during said self-test mode, to form a self-test capacitor, useable by said detection circuit to causing flexing of said moveable plate.

2. An acceleration sensing module as set forth in claim 1 wherein said moveable plate is held at a fixed electrical potential and comprises:
    an aperture, said pedestal being positioned within said aperture, and connected to said substrate; and
    means for connecting said pedestal to at least one edge of said aperture, to allow said moveable plate to rotate, relative to said substrate, about a flexure axis, in the presence of a force normal to said substrate.

3. An acceleration sensing module as set forth in claim 2 wherein said means for connecting said pedestal to at least one edge of said aperture comprises a pair of torsion bars for connecting opposite sides of said pedestal to opposite edges of said aperture, said torsion bars creating said flexure axis, which the moveable plate rotates about in the presence of an acceleration normal to the plane of the substrate.

4. An acceleration sensing module as set forth in claim 3 wherein said third electrode is formed to extend along at least two opposing sides of said second electrode.

5. An acceleration sensing module as set forth in claim 4 wherein said moveable plate is shaped substantially in the form of a trident with a handle end of said trident extending over said first electrode and a center prong of said trident, which is opposite to said handle end, extending over said second electrode.

6. An acceleration sensing module as set forth in claim 4 wherein said moveable plate is shaped substantially in the form of a paddle with a lighter end of said paddle extending over said first electrode and a heavier end of said paddle, opposite to said lighter end, extending over said second electrode.

7. An acceleration sensing module as set forth in claim 1 wherein said moveable plate is shaped substantially in the form of a trident with a handle end of said trident extending over said first electrode and a center prong of said trident, which is opposite to said handle end, extending over said second electrode.

8. An acceleration sensing module as set forth in claim 1 wherein said moveable plate is shaped substantially in the form of a paddle with a lighter end of said paddle extending over said first electrode and a heavier end of said paddle, opposite to said lighter end, extending over said second electrode.

9. An acceleration sensing module comprising:
    a detection circuit operable in a first mode to detect an acceleration force, and in a second mode to test the operability of an accelerometer;
    said accelerometer comprising:
        a substrate;
        a moveable plate held at a fixed electrical potential and substantially parallel to and above said substrate, comprising,
            an aperture,
            a pedestal positioned within said aperture, and connected to said substrate; and
            means for connecting said pedestal to at least one edge of said aperture, to allow said moveable plate to rotate, relative to said substrate, about a flexure axis, in the presence of a force normal to said substrate;
        a first electrode formed upon said substrate and coupled to said detection circuit to receive an AC voltage during said first mode and said second mode;
        a second electrode formed upon said substrate at a position opposite of said flexure axis from said first electrode, and coupled to said detection circuit to receive a voltage substantially similar to said AC voltage during said first and said second modes; and
        a third electrode formed upon said substrate to surround said aperture and extend on at least two opposing sides around said second electrode, said third electrode coupled to said detection circuit and having an electrical potential substantially equal to said fixed electrical potential of said substrate during said first mode, and at a different electrical potential during said second mode to perform a self-test of the accelerometer.

10. An acceleration sensing module as set forth in claim 9 wherein said moveable plate is shaped substantially in the form of a trident with a handle end of said trident extending over said first electrode and a center prong of said trident, which is opposite to said handle end, extending over said second electrode.

11. An acceleration sensing module as set forth in claim 9 wherein said moveable plate is shaped substantially in the form of a paddle with a lighter end of said paddle extending over said first electrode and a heavier end of said paddle, opposite to said lighter end, extending over said second electrode.

* * * * *